Jan. 8, 1963 — E. STIPAN — 3,072,429
ROPE PLACING APPARATUS
Filed Aug. 19, 1960 — 2 Sheets-Sheet 1
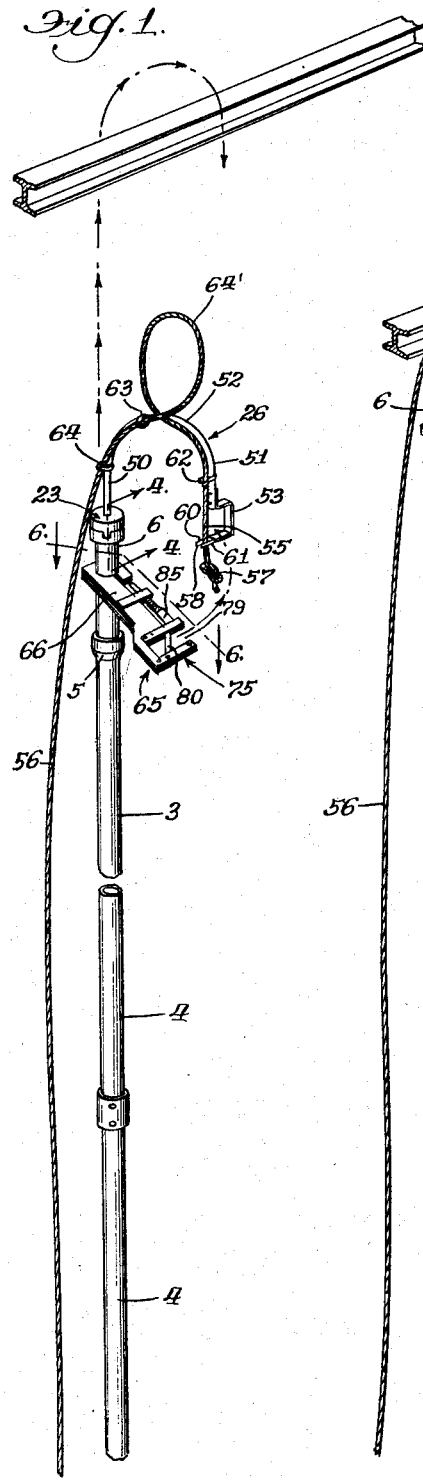
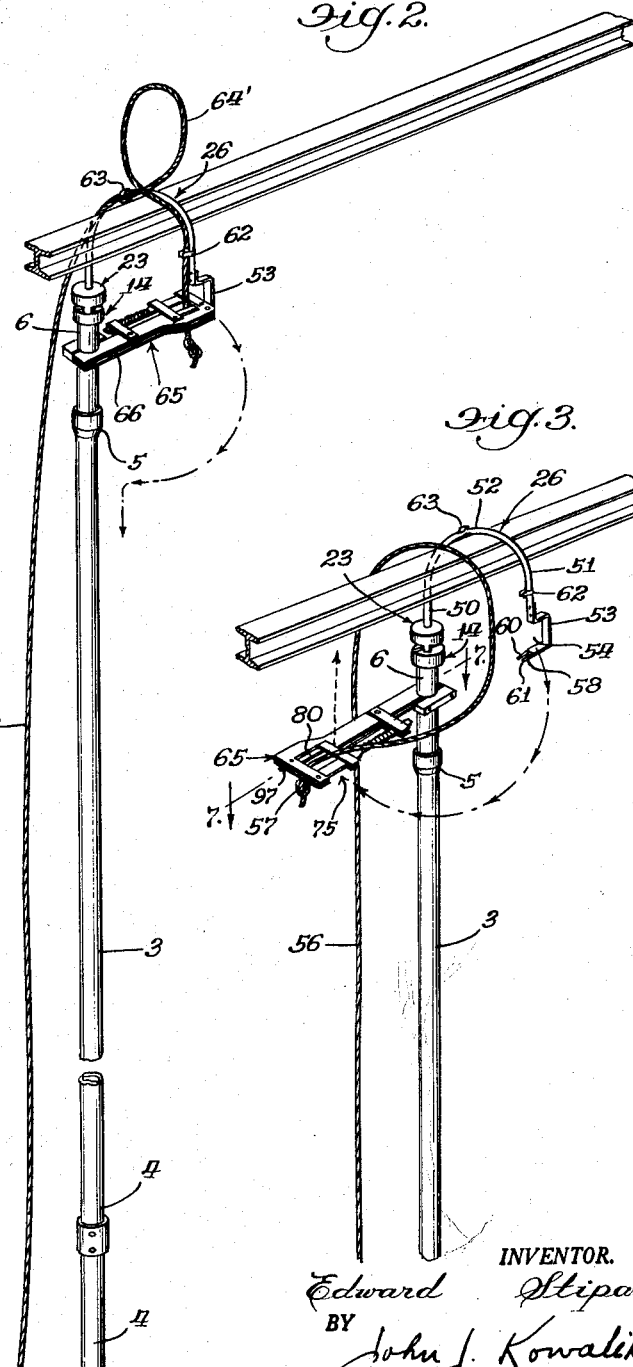
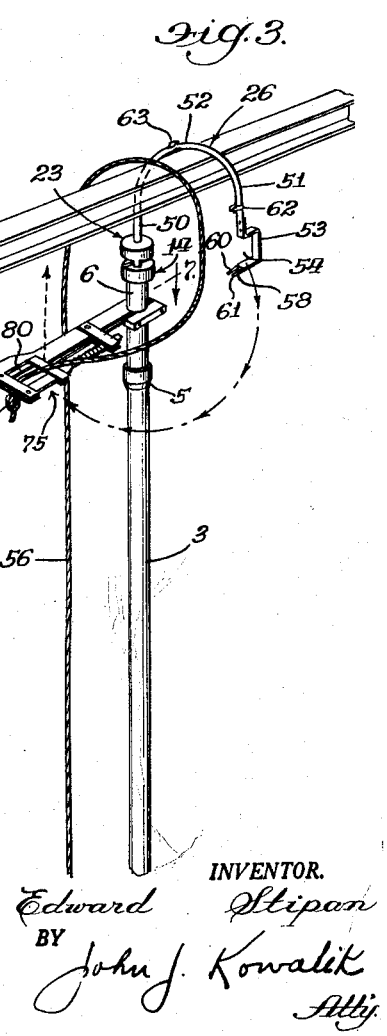
INVENTOR.
Edward Stipan
BY John J. Kowalik
Atty.

Jan. 8, 1963  E. STIPAN  3,072,429
ROPE PLACING APPARATUS
Filed Aug. 19, 1960  2 Sheets-Sheet 2
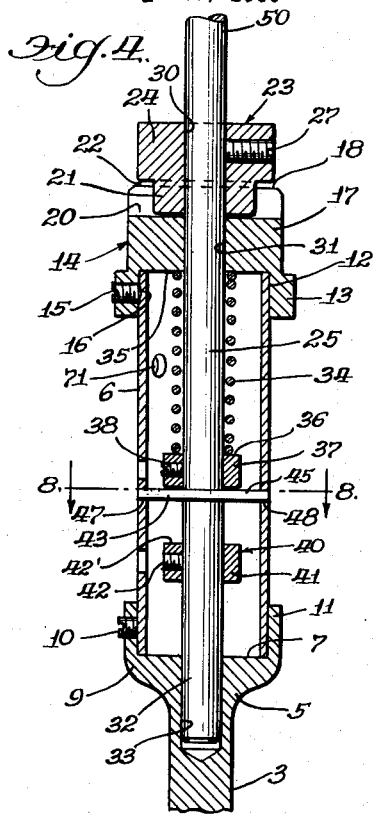
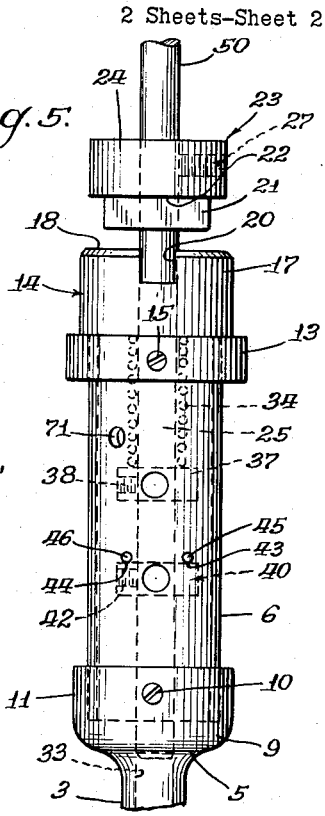
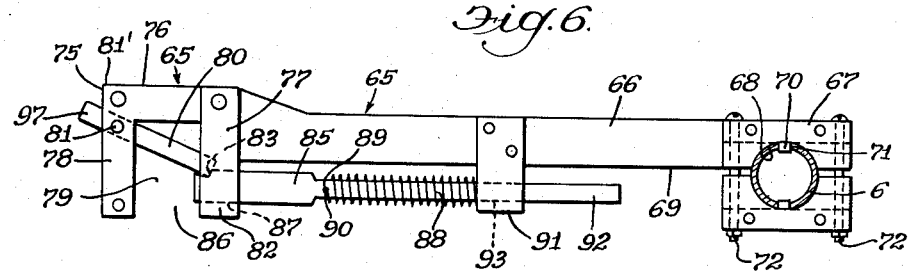
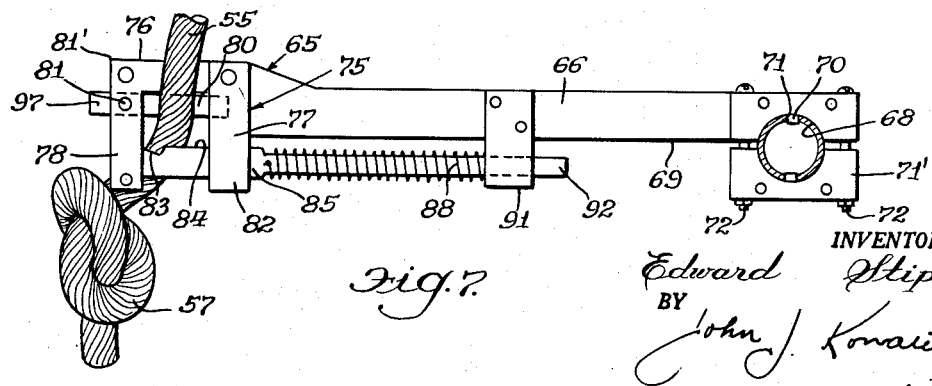
INVENTOR.
Edward Stipan
BY John J. Konarik
Atty.

United States Patent Office 3,072,429
Patented Jan. 8, 1963

3,072,429
ROPE PLACING APPARATUS
Edward Stipan, Frankfort, Ill.
Filed Aug. 19, 1960, Ser. No. 50,720
3 Claims. (Cl. 294—19)

This invention relates to a mechanism for positioning a rope, cable or the like over an elevated object such as a tree limb, girder, etc., so that the rope may be secured thereto or serve as a hoist for articles to be lifted.

A general object of the invention is to provide a novel device for stringing a rope over a high structure and which is positive in action, rugged in construction and adaptable for use by inexperienced workmen.

A more specific object of the invention is to provide a novel mechanism of the type described which incorporates an inverted U-shaped rope-supporting overhanging hook having a jaw at one end which is bridged by the free end of the rope releasably supported by the hook, the portion of the rope within the jaw being grasped by a bill hook carried by a reach pole which also supports the overhang attendant to rotation of the pole by the operator, the bill hook latching onto the free end of the rope which is then withdrawn from the jaw by the operator counter rotating the reach pole to dispose the bill hook to one side and clear of the elevated object over which the rope is passed whereupon the mechanism may be elevated and removed from the object.

These and other objects inherent in and encompassed by the invention will become more readily apparent from the specification and the drawings, wherein:

FIGURE 1 is a perspective view of the apparatus illustrating the position of the mechanism preparatory to overhanging a girder;

FIGURE 2 illustrates the apparatus overhung and the bill hook engaged;

FIGURE 3 shows the rope looped over the object and the mechanism preparatory to removal;

FIGURE 4 is a fragmentary sectional view of the mechanism taken substantially on line 4—4 of FIGURE 1;

FIGURE 5 is a fragmentary enlarged side elevational view;

FIGURE 6 is a plan view of the bill hook taken on line 6—6 of FIGURE 1;

FIGURE 7 is a plan view of the bill hook taken on the line 7—7 of FIGURE 3; and

FIGURE 8 is a section on line 8—8 of FIGURE 4.

Describing the invention in detail, the rope bighter generally indicated 2 comprises elevating means in the form of a reach pole 3 which may comprise several telescoped sections 4, 4 the uppermost section being provided with a flanged holder 5 which sockets the lower end of a housing 6 in the form of a cylindrical tube which seats at its lower edge against the ledge 7 at the bottom of the socket portion 9 of holder 5 to which the sleeve 6 is secured as by a screw 10 which passes through the flange 11 of socket 5.

The upper end of the flange sleeve 6 fits into a bore 12 in a peripheral flange 13 of a lower jaw clutch portion 14 and is secured thereto as by a screw 15, which is threaded through flange 13 and abuts against sleeve 6 within an aperture 16 therein. The clutch member 14 comprises a head 17 at its upper end which is provided with an upper radial face 18 and a diametrical slot 20 which receives diametrical teeth 21 which project downwardly from the radial underface 22 of the upper jaw clutch member 23 which has a cylindrical collar 24 sleeved over the shaft extension 25 of the overhanging U-shaped hook generally designated 26. The collar 24 is secured by set screws 27, 27 to the shaft extension 25. It will be realized that the upper jaw clutch member 24 is adjustable axially as well as circumferentially about the shaft extension 25 which passes through the axial central bore 30 in the jaw member 23 and through a corresponding central axial bore 31 in the lower clutch member 14.

The shaft extension 25 projects concentrically through the sleeve 6 and enters with its lower end 32 into a pilot or guiding bore 33 in the holder 5.

A compression spring 34 is sleeved over the extension 25 and at its upper end abuts against the seat 35 formed on the underside of the head 17 of the clutch element 14 and the lower end of the spring seats as at 36 against the upper side of a collar 37 which is secured by a set screw 38 to the extension 25.

The spring 34 biases and urges the shank portion 25 downwardly and thereby engaging the upper clutch element 24 with the lower element 14 and in the position shown in FIGURE 4, the teeth 21 enter slot 20 and in the position of FIGURE 5 the teeth 21 are withdrawn from the slot and upward movement of the hook and shank with coincidental disengagement of the clutch elements is limited by the stop means generally indicated 40 which comprises a collar 41 sleeved on the extension 25 and secured thereto by a set screw 42, collar 41 having an upper abutment face 42′ engaging with the underside edges 43, 44 of the chordally extensing wire stops 45 and 46 which flank the shank portion 25 and extend tangentially thereof between the collars 37, 41. The wires 45, 46 project through aligned openings 47, 48 and 49, 50′ respectively in the sleeve 6.

The hook 26 comprises a pair of generally upright legs 50, 51 and an interconnecting bight portion 52, the leg 50 merges into the shank portion 25 which controls the disposition of the hook through the clutch and manipulation of the pole. The hook is provided at the lower end of the free leg 51 with a jaw 53 which includes a pair of upper and lower portions projecting substantially normal to leg 51 and an interconnecting upright portion, the upper portion being connected to the lower end of leg 51 and the lower portion being spaced beneath the leg 51 and providing an entry way 54 which is bridged by the free end portion 55 of a rope 56. The rope having a knotted lower end 57 which projects through the bifurcation 58 which has a pair of laterally spaced resilient fingers 60, 61 yieldably embracing portion 55 of the rope with the knot 57 disposed therebeneath. The rope is laid alongside the hook 26 and held thereagainst by spring fingers 62, 63, 64 thereon. The rope is provided with a slack loop 64′ above the bight portion 52′ to facilitate its release from the hook by the bill 65 as readily apparent from FIGURES 2 and 3.

The bill of catching mechanism 65 comprises a radial arm 66 having an inner end 67 with a semi-circular notch 68 on its lateral edge 69, the notch nesting one side of the cylindrical sleeve 6 and having a lug 70 projecting into a complementary opening 71 in the sleeve 6. The arm end portion 67 cooperates with a complementary clamp 71′ which is removably secured thereto as by bolts 72, 72 which draw the clamp and end portion 67 against the intervening sleeve 6.

The outer end of the arm is provided with a bill or jaw 75 which includes a back portion 76 and inner and outer jaw portions 77 and 78 spaced lengthwise of the arm and providing a rope-admitting space 79 which in the triggered position is bridged intermediate its ends by a trigger latch 80 which is pivoted intermediate its ends by bolt 81 to the outer portion 78 and extends diagonally from adjacent the corner 81 formed by the portion 78 and back part 76 to adjacent the distal extremity 82 of the inner jaw portion 77 and engaging with its free end in a notch 83 in the back edge 84 of a bolt 85 which is slidably supported for movement across the open end 86 of the space 79.

The bolt, which is shown set in FIGURE 6 and triggered in FIGURE 7, comprises an elongated element extending through a slot 87 formed in leg 77 generally coplanar with arm 66 and is ensleeved by a compression spring 88 which has an end 89 extending through an opening 90 in the bolt element, the other end of the spring seating against a bracket 91 which is connected to the arm 66 intermediate its ends and projects outwardly of the edge 69, the rear end 92 of the bolt projecting through a slot 93 formed in bracket 91.

It will be readily apparent that upon the entry of the rope into the space 79, the latch 80 will be tripped withdrawing its free end from the notch 83 whereupon the bolt is projected across the open end 86 of the jaw 75 behind the rope portion.

Operation of the Device

The apparatus is conditioned as shown in FIGURE 1 with the jaw clutch elements 14 and 23 engaged and the rope is clipped to the fingers 62, 63 and 64. A slack loop 64' is provided and the knot 57 placed beneath the fork and end portion 55 located across the entry way 54. The apparatus is then elevated and the hook 25 engaged over the object such as the girder as seen in the drawings. The pole is then pulled downwardly disengaging the lower clutch 14 from the upper clutch 23 with attendant compression of spring 34. In this position the pole is rotated counterclockwise (FIGURE 1) to the position shown in FIGURE 2 wherein the bill end 75 is passed through the jaw 53 entering the rope portion 55 into the space 79 whereupon the latch 80 is sprung rearwardly permitting the bolt 85 to advance to locking position. The pole is then rotated in a clockwise direction (FIGURE 3) carrying the rope therewith and disengaging it from the fingers on the hook 25. The arm is swung back far enough to clear the girder whereupon the unit is elevated to clear the hook 25 which is rotated to one side of the girder and lowered while the arm pulls the free end of the rope down. The knot 57 engages behind the bolt and latch and prevents withdrawal of the rope.

It will be noted that the latch 80 has an outer extension 97 outwardly of jaw portion 77 by which the latch is manually manipulated to engage in the notch 83 upon the bolt being manually withdrawn from the locked to the set position.

It will be understood that the foregoing embodiment of the invention has been chosen by way of illustration and not limitation and that various forms of the device will be readily apparent to those skilled in the art within the scope of the appended claims.

I claim:

1. A rope hanging device, the combination of an inverted U-shaped element having a pair of vertical legs and an intervening bight, a reach member having a housing portion rotatably mounting one of the legs, said element and member relatively movable axially and rotatably, clutch means connected between said element and member and axially engageable and disengageable, abutment means on said housing portion and on said one leg respectively, spring means reactively interposed between said abutment means and biasing said element and member to engaged position of said clutch means, said spring means compressible attendant to disengagement of the clutch means, releasable rope holding means on the other of said legs, and horizontally extending rope grasping means on said reach member swingable to and from said holding means by rotation of said reach member when said clutch means is disengaged.

2. In a rope locating device, an elevating structure including a reach, an overhanging hook at the upper end of the reach rotatably connected therewith, said hook having laterally projecting fingers, a rope releasably supported by the fingers, a jaw on the other end of the hook providing an entry way, said rope having a free-end portion bridging said entry way, an arm connected to the reach and swingable thereby through said entry way, said arm having a free end with a bill structure having a rope-receiving opening disposed in registry with the rope-length as said arm is passed through said entry way, a bolt on the arm biased to move across said opening in closing relation thereto and a trigger latch pivotally supported on the arm and extending through said opening of the bill and releasably interlocked with the bolt holding the same in unlatched position and engageable with the rope length when the same is entered into said bill opening whereby said latch will release said bolt thereby retaining the rope within the confines of said bill allowing the rope to be attached thereto when said arm is swung away from the jaw portion of the hook.

3. In a rope hanging device, the combination of an inverted U-shaped member, a reach member rotatably connected to one end of said U-shaped member on a substantially vertical axis, spring-biased clutch means connected to respective members and engageable and separable through relative movement of said members axially of said connection and respectively accommodating and restricting relative rotation of said members, and means having a jaw portion connected to the other end of said U-shaped member, means connected to said reach member having a bill portion, said jaw and bill portions being interdigitated attendant to said members being relatively rotated, a rope having a length detachably supported from said jaw portion, and said bill portion having grasping means catching and holding said rope length upon said portions being interdigitated, said bill portion adapted to be swung from under said U-shaped member away from the jaw portion with said rope attached.

References Cited in the file of this patent

UNITED STATES PATENTS

| | | |
|---|---|---|
| 1,426,220 | Sajtar | Aug. 15, 1922 |
| 1,856,069 | Dina | May 3, 1932 |
| 2,100,237 | Bubes | Nov. 23, 1937 |
| 2,543,862 | Manahan | Mar. 6, 1951 |
| 2,550,770 | Calemmo | May 1, 1951 |
| 2,658,784 | Runde | Nov. 10, 1953 |
| 2,704,052 | Wood | Mar. 15, 1955 |
| 2,730,985 | Wingate | Jan. 17, 1956 |

FOREIGN PATENTS

| | | |
|---|---|---|
| 250,367 | Great Britain | Apr. 15, 1926 |
| 287,407 | Great Britain | Mar. 22, 1928 |
| 442,857 | Great Britain | Feb. 14, 1936 |